United States Patent [19]

Wilson et al.

[11] 4,430,849

[45] Feb. 14, 1984

[54] HARVESTER FOR TEA OR THE LIKE

[75] Inventors: Robert W. Wilson, Charlotte; Olin C. Trull, Monroe, both of N.C.

[73] Assignee: Powell Manufacturing Co., Bennettsville, S.C.

[21] Appl. No.: 317,783

[22] Filed: Nov. 3, 1981

[51] Int. Cl.³ .................... A01D 87/10; A01D 46/04
[52] U.S. Cl. ...................... 56/12.8; 56/16.6; 56/121.41; 56/DIG. 8
[58] Field of Search ............ 56/13.3, 12.9, 12.8, 56/14.4, 14.5, 501, DIG. 8, 327 R, 126, 16.4, 16.6, 121

[56] References Cited

U.S. PATENT DOCUMENTS

| 2,492,495 | 12/1949 | Nelson | 56/16.6 |
|---|---|---|---|
| 2,710,516 | 6/1955 | Kaesemeyer | 56/DIG. 8 |
| 2,780,046 | 2/1957 | Edwards | 56/DIG. 8 |
| 3,165,874 | 1/1965 | Osteen | 56/12.9 |
| 3,406,505 | 10/1968 | Hanson | 56/12.8 |
| 3,624,697 | 11/1971 | Fuller | 56/16.6 |

FOREIGN PATENT DOCUMENTS 641912 1/1979 ............................................. 56/13.3

Primary Examiner—Robert P. Swiatek
Assistant Examiner—John Weiss

[57] ABSTRACT

A tea harvester in the form of a wheeled vehicle adapted to straddle at least one row of plants carries therebeneath a horizontal transverse cutter bar in position to clip the tops of the plants in a row. Blower and manifold means are carried by the vehicle for emitting a horizontally-elongated vertically narrow stream of air rearwardly and downwardly across the cutter bar for blowing clippings rearwardly off the bar into the mouth of a conveyor means. The undersurface of the manifold means and its airstream-defining outlet are spaced above and forwardly of the bar to enable the tops of the plants to stand upright in the path of the airstream while being clipped. The conveyor means extends upwardly and rearwardly to convey the clippings to a collecting receptacle. The cutter bar, the blower and manifold means, and the conveyor means are all mounted to vehicle for vertical adjustment to adjust the above-ground cutting height of the cutter bar.

13 Claims, 8 Drawing Figures

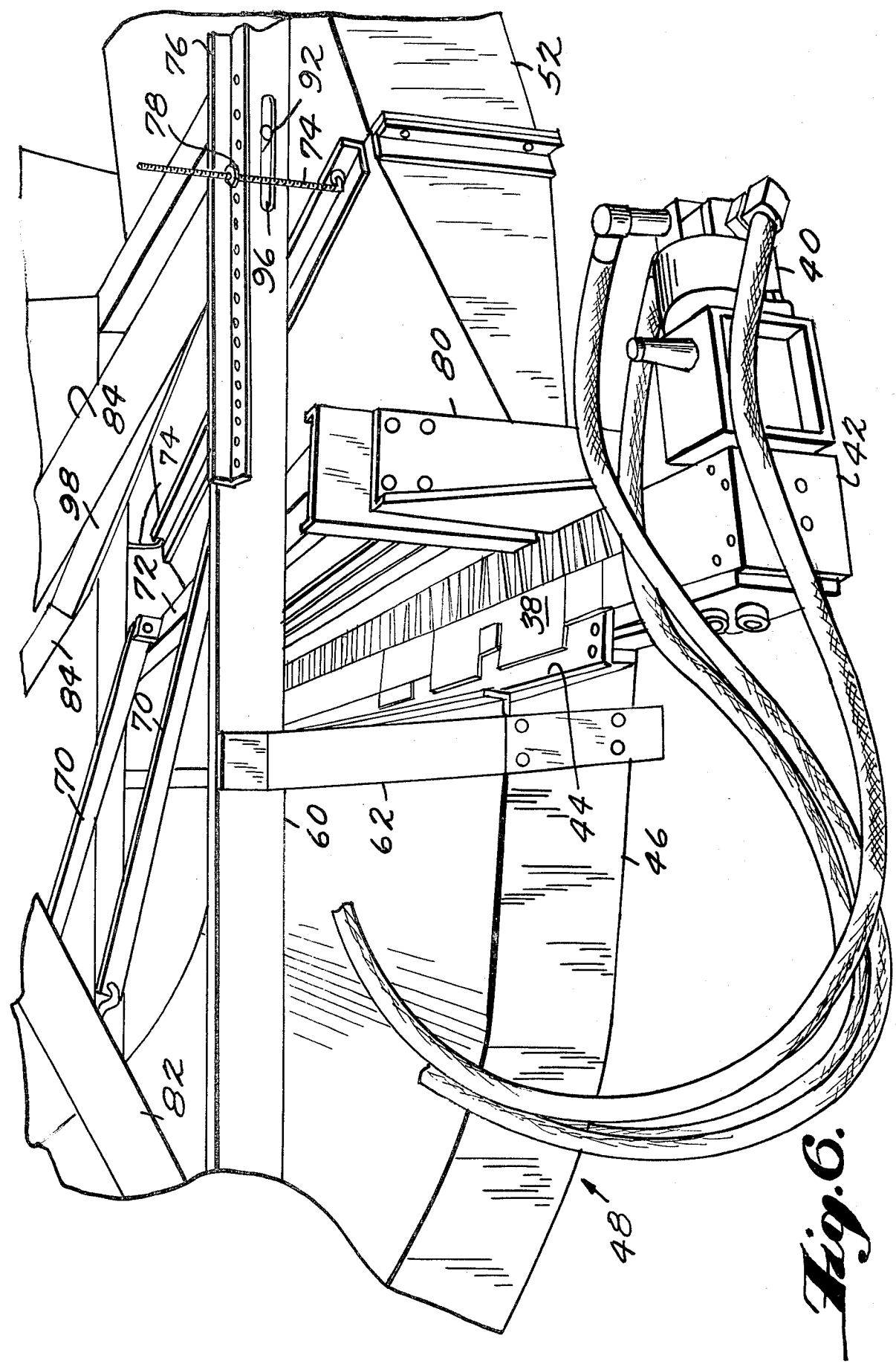

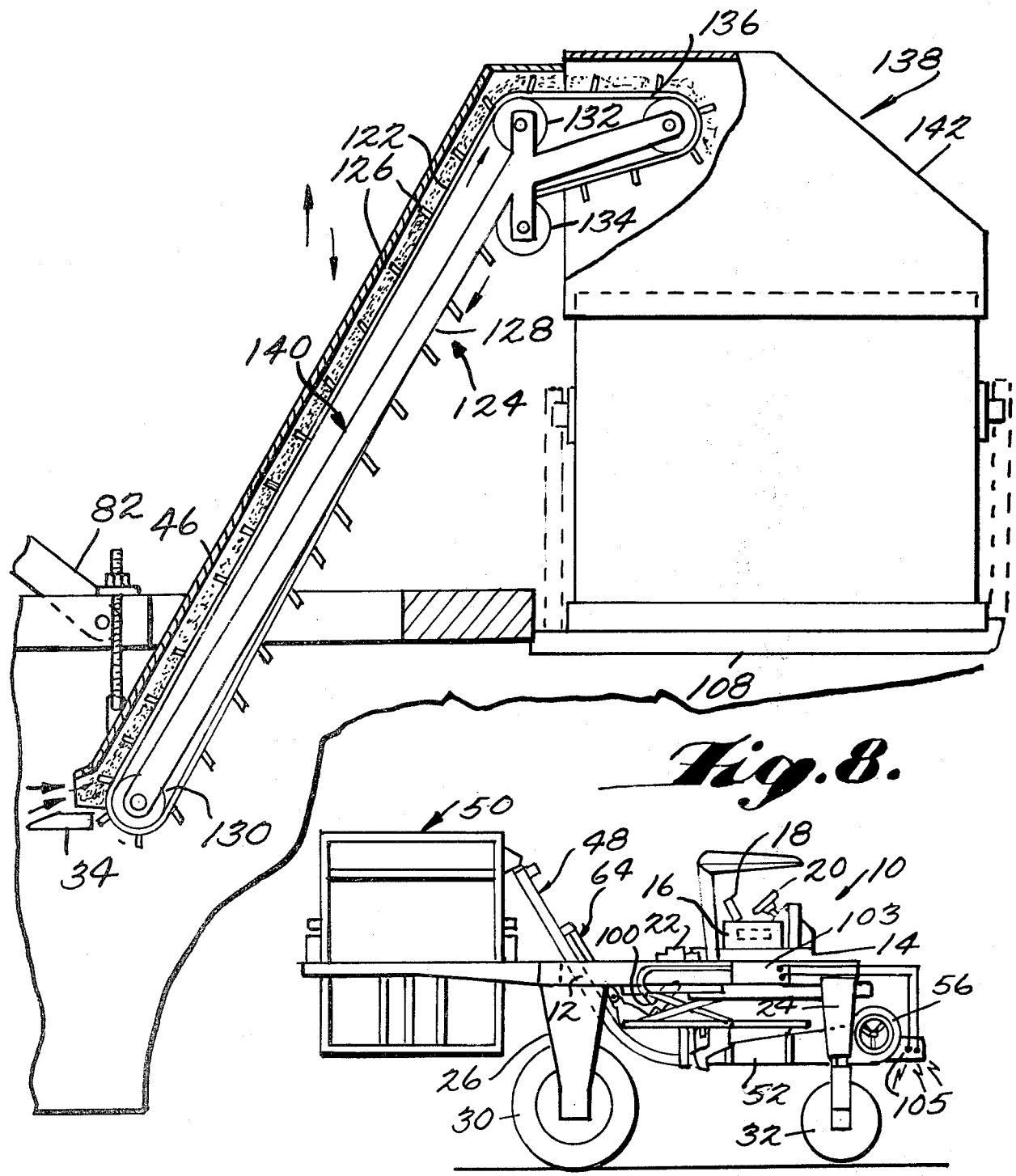

HARVESTER FOR TEA OR THE LIKE

FIELD OF THE INVENTION

This invention relates to a machine for harvesting new top growth of plants, i.e. plant shoots, especially tea plants.

BACKGROUND OF THE INVENTION

In the past tea buds were plucked individually by hand, an expensive slow method of harvesting tea. Mechanical tea harvesters subsequently were developed, but all suffered from various differences, such as low capacity, inefficiency, etc. Such tea harvesters, in common with harvesters of other types of crops, e.g. grain, asparagus or the like, used a sickle or cutter bar having a reciprocating toothed cutter blade, to clip the harvestable shoots or buds from the tops of tea plants, and an airstream of some sort to convey the clippings to a collecting device. Examples of such harvesters for other types of crops or grass are disclosed in the following U.S. Pat. Nos.:

Miller, 3,193,995, July 13, 1965
Quick 3,555,790 Jan. 19, 1971
Hatton 3,665,687 May 30, 1972
Porter 3,760,573 Sept. 25, 1973
Quick 3,828,531 Aug. 13, 1974

All such harvesters suffered, however, from various deficiencies, as pointed out above, and cannot provide efficient practical harvesting of tea, taking into account the necessity of maintaining a correct cutting height for the cutter bar.

A grain harvester that has a stripping cylinder in contrast to a cutter bar, and provides for vertical adjustment of the cylinder, is disclosed in the patent to Engle, U.S. Pat. No. 1,122,375, Dec. 29, 1914, while the patent to Winger, U.S. Pat. No. 3,527,031, Sept. 8, 1970, shows a field crop harvester having a vertically adjustable cutter bar. Again, however, the Engle and Winger harvesters are impractical for harvesting tea or similar agricultural crops.

BRIEF SUMMARY OF THE INVENTION

Accordingly, it is an object of this invention to provide an improved, efficient, economical, practical harvester for tea, or the like, that can be operated by one man, has a large capacity and is readily adjustable to accommodate different plant heights.

The object is accomplished by a self-propelled vehicle having a transverse cutter bar adapted to move along a row of plants and clip off their tops. A downwardly and rearwardly directed stream of air blows the clippings off the bar into the mouth of a closed conveyor means which elevates them upwardly and rearwardly into a collecting container. The airstream directing means, the cutter bar and the conveyor means are all carried for vertical adjustment on the vehicle to a desired cutting height.

Other objects and advantages of the invention will become apparent from the following description and accompanying drawings in which:

BRIEF DESCRIPTION OF THE DRAWINGS

FIG. 6 is an enlarged fragmentary perspective view corresponding to FIG. 5 of an opposite side portion of the harvester.

FIG. 7 is a fragmentary side view, partly in vertical section, showing a modified form of the conveying means for elevating and carrying the clippings to a collecting bin.

FIG. 8 is a side elevational view of the tea harvester shown in FIG. 1 illustrating schematically thereon the components for automatically adjusting the cutter bar height.

DETAILED DESCRIPTION OF THE INVENTION

Figure 1:
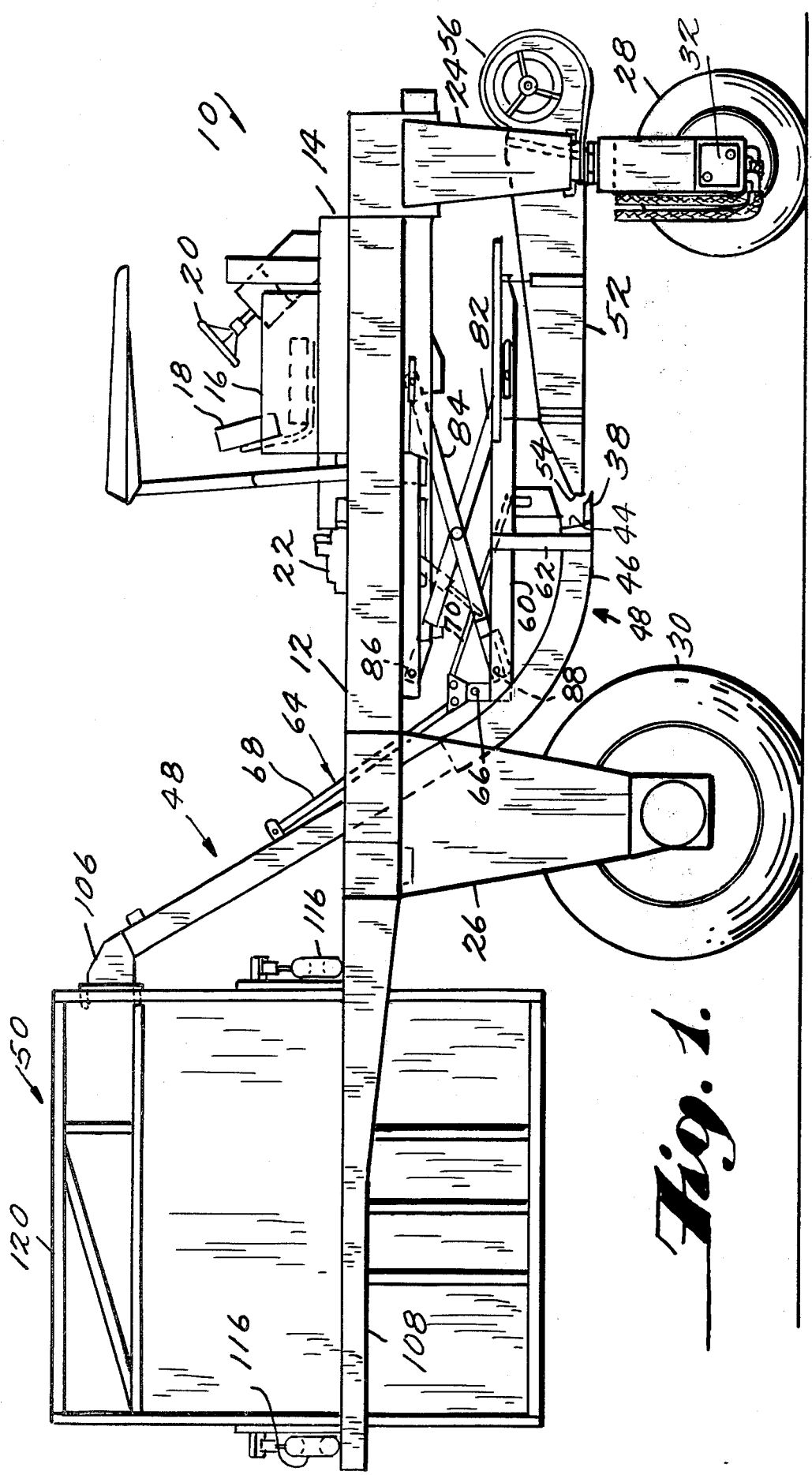
FIG. 1 is a side view of a tea harvester embodying this invention.
Figure 2:
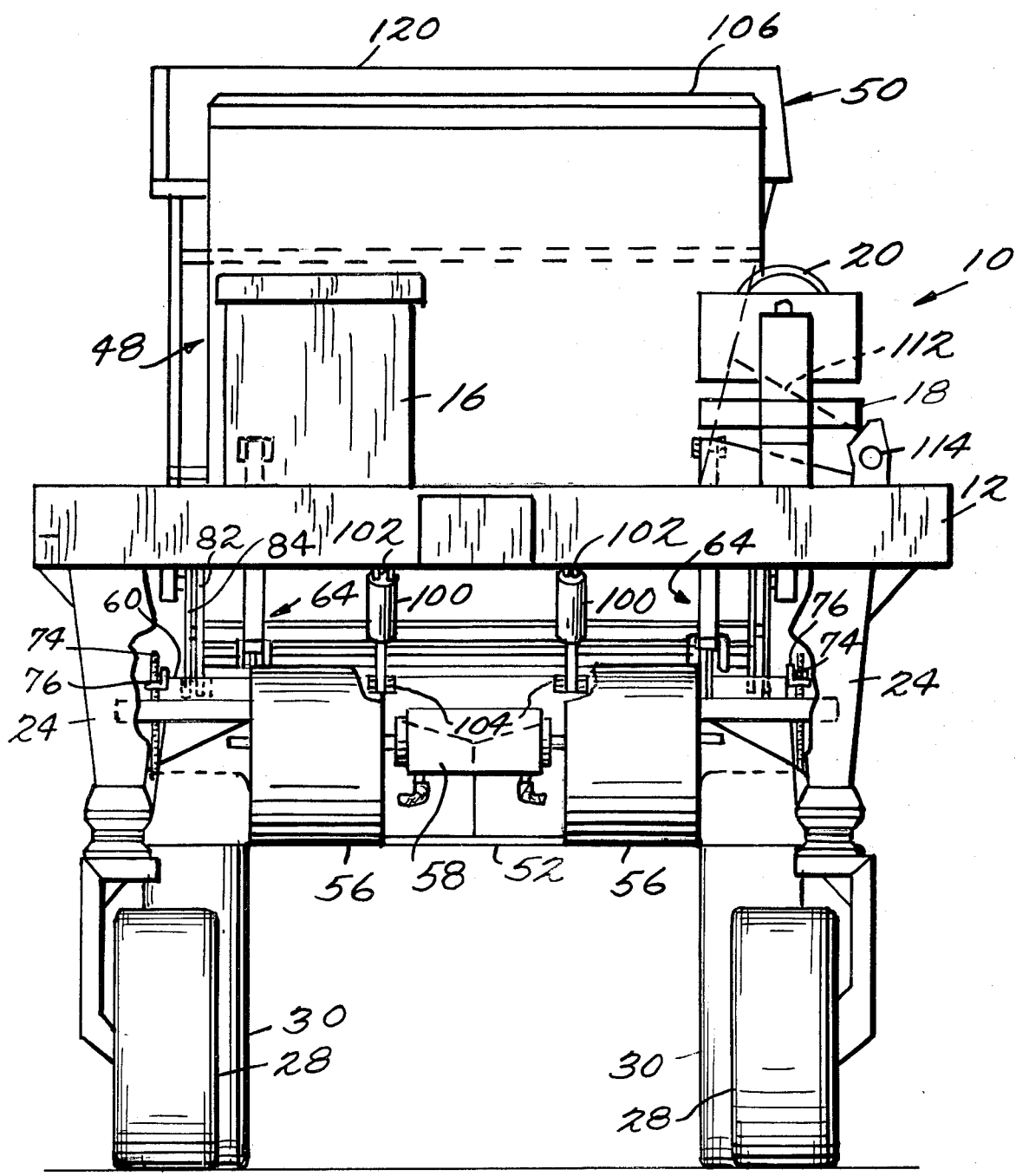
FIG. 2 is a front view of the harvester shown in FIG. 1 with parts broken away to show details.
Figure 3:
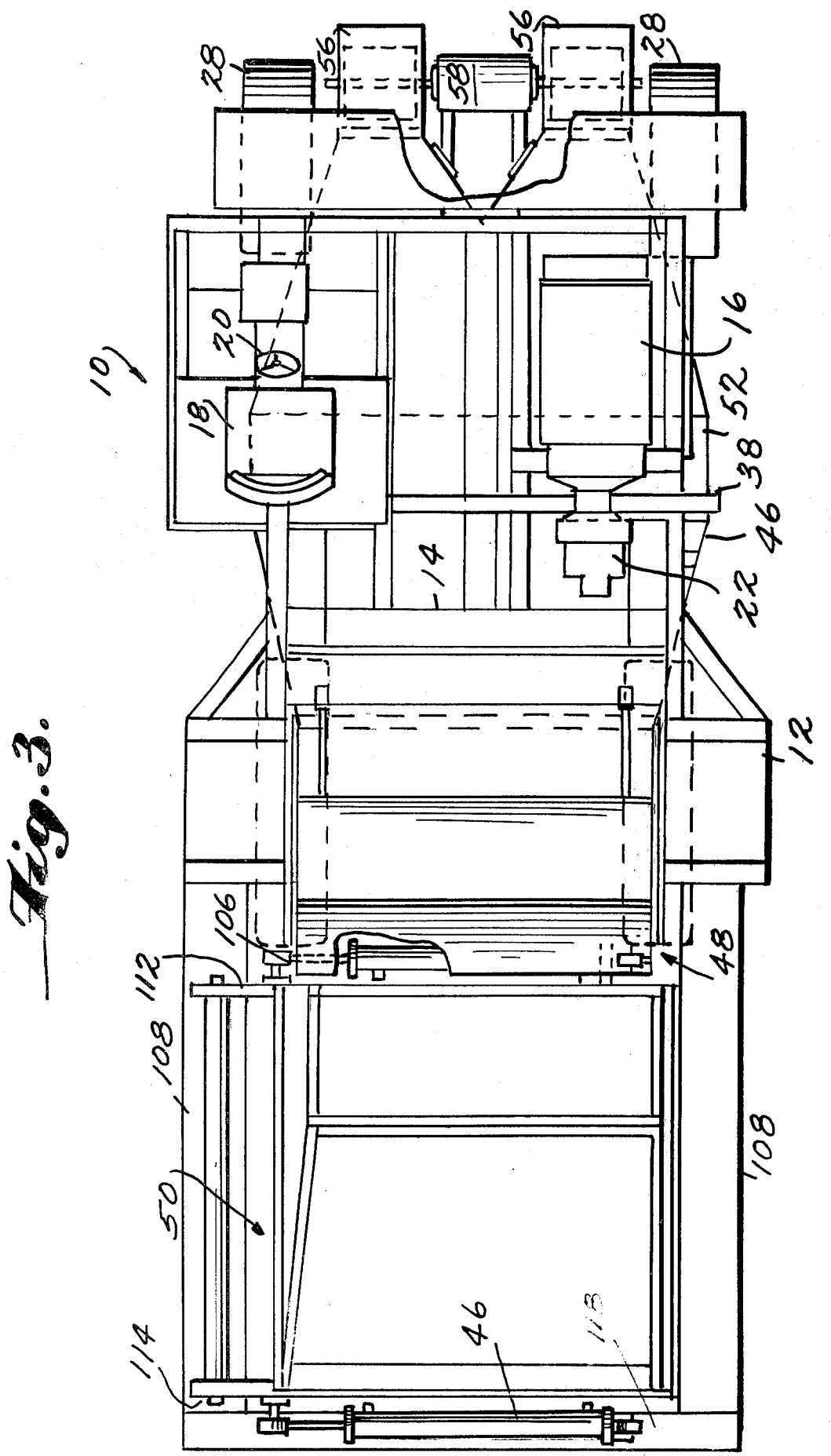
FIG. 3 is a top view of the harvester shown in FIG. 1.

Referring now to the drawings, there is shown a self-propelled vehicle 10 embodying this invention especially adapted for the harvesting of tea, although it will be realized that the principles of the invention could be embodied in the harvesters for plant products other than tea, such as leaf lettuce, lemmon grass, etc. The vehicle 10 has a generally rectangular frame 12 supporting on one side of its forward portion a platform 14 carrying an internal combustion engine 16 and on the other side an operator-driver's station having the usual operator-driver's seat 18 and whereat are located the necessary controls and steering wheel 20. The vehicle 10 may be propelled by hydraulic motors, and other functions, later described, also may be performed hydraulically. Hence, the engine 16 may be used to drive a hydraulic pump 22. Depending from the corners of the frame 12 are a pair of front legs 24 and a pair of rear legs 26 both adapted to straddle one or more rows of plants. Rubber-tired wheels 28, 30 are mounted on the lower ends of the respective legs 24 and 26 with the front wheels 28 being steerable by the steering wheel 20 and driven by hydraulic motors 32. Preferably the wheels 28 and 30 are provided with suitable skirt-like shrouds 34 and 36, respectively (shown only in FIGS. 4 and 5), to prevent damage to the plants.

Carried beneath the frame 12 between the pairs of wheels 28 and 30 is a cutter bar 38 having a reciprocating toothed cutter blade cooperating with a stationary toothed blade or an oppositely reciprocating toothed blade. The cutter bar 38 faces forward and extends transversely from side to side of the vehicle in position to clip the tops of the plants in a row or rows traveled by the vehicle 10. The cutter bar 38 may be driven by a variable-speed hydraulic motor 40 (FIG. 6) connected to a conventional transmission 42 at one end of the bar for converting rotary motion to reciprocating motion. The stationary portion of the bar 38 is relatively wide and has its rear edge secured to the lower edge of the elongated mouth 44 of the housing 46 of a closed conveyor 48 for receiving the clippings. The housing 46 extends rearwardly and upwardly through an opening in the frame 12 for discharging the clippings into a container 50, as later described.

Mounted in front of the cutter bar 38 is a box-like air manifold 52 which tapers vertically rearwardly to a long narrow outlet or nozzle opening 54 spaced in front of and above the cutter bar for directing a flat stream of air downward and rearward onto the bar for blowing clippings into the mouth 44 of the conveyor housing 46. In order to receive all of the clippings, the vertical height of the mouth 44 is somewhat greater than that of the nozzle opening 54. The manifold 52 is supplied with air by blowers 56, two are shown in the drawings, driven by a variable speed motor 58 which may be hydraulic and powered by the pump 22 with suitable controls (not shown) at the driver-operator station. The blowers 56 and their motor 58 preferably are supported on the front of the manifold 52.

The bottom of the manifold 52 and the lower edge of the nozzle opening 54 are spaced above and in front of the cutter bar 38 so that the tops or shoots of plants to be clipped will stand upright and become engaged in the airstream issuing from the nozzle opening in order to be clipped properly. The proper vertical and horizontal spacing between the nozzle opening 54 and the cutter bar 38 depends upon the velocity of the airstream and its angle with the horizontal, velocity of the machine through the field, and condition of the crop. Further, the stationary portion of the bar 38 and the mouth 44 of the conveyor housing provide a flat horizontal surface, rearwardly of the cutting teeth, to enable the clippings to be accelerated by the airstream into the mouth 44 of the conveyor housing 46 prior to elevating the clippings in the conveyor 48.

The conveyor housing 46 is supported from a rectangular frame 60 located beneath the vehicle frame 12 between the front and rear legs 24 and 26. For this purpose straps 62 depend from the frame 60 and are secured to the sides of the lower forward portion of the housing 46 while a truss arrangement 64 supports the upper rearward portion of the housing. The truss arrangement 64 includes upstanding compression legs 66 on the rear member 67 of the frame 60, tension members 68 connected between the upper portion of the conveyor housing 46 and the tops of the legs 66, and tension members 70 connected between a cross bar 72 on the frame 60 and the tops of the legs 66. The manifold 52 also is supported from the frame 60 for adjustment of both its vertical and horizontal positions relative to the frame by front and rear pairs of screws or bolts 74 having their lower ends fastened to the housing and their upper ends extending through selected holes in rows thereof in brackets 76 secured to the side members of the frame 60. An adjusting nut 78 on each screw 74, bearing against the upper side of the bracket 76, is used to raise or lower the screw and correspondingly to raise or lower the manifold 52 or to tilt it front to rear to adjust the angle of the airstream relative to the horizontal. Each screw 74 preferably has a lock nut (not shown) beneath the bracket 76. The row of holes in the brackets 76 also enables the position of the manifold 52 to be adjusted rearwardly or forwardly relative to the frame 60 and hence, relative to the cutter bar 38. The driving motor 40 for the cutter bar 38 is supported on a motor bracket 80 depending from the frame 60.

The frame 60 is supported from the vehicle frame 12 for vertical adjustment to change the cutting height of the cutter bar 38 for proper accommodation to the height of the plants to be cut. A scissors mechanism having two pairs of crossed pivotally-connected arms 82, 84 is connected to and between the side members of the frames 12 and 60. The upper ends of a corresponding set of arms 84 of each pair are connected for pivotal movement about a common horizontal axis, at at 86, to the side members of the frame 12, while the lower ends of the other corresponding set of arms 82 are connected for pivotal movement about a common axis, as at 88, to the side members of the frame 60. The other ends of the arms 82, 84 are connected to the frames 12 and 60 for sliding movement in rearward and forward directions, as by lateral projections 90, 92 on the arms 82, 84, respectively, engaged in horizontal slots 94, 96, respectively, in the frames 12 and 60, so that vertical expansion or contraction of the scissors mechanism will raise or lower the cutter bar 38, its driving motor 40, the manifold 52 and blowers 56, and the conveyor housing 46. The sliding ends of the corresponding arms 82, 84 of the two pairs are connected by transverse bars 98 to assure movement in unison so that the frame 60 will remain parallel to the vehicle frame 12 at all times.

Expansion and contraction of the scissors mechanism to adjust the cutting height of the cutter bar 38 may be effected by a pair of hydraulic cylinders 100 having one end of each cylinder pivotally connected, as at 102, to a transverse member of the vehicle frame 12 and the end of each piston rod pivotally connected, as at 104, to a transverse member of the frame 60. A control (not shown) for the cylinders 100 is provided at the driver-operator station. FIG. 8 illustrates schematically an automatic control for adjusting the cutter bar height. As shown, a control 103 is provided which is automatic in response to a conventional mechanism 105 secured, for example, at the front of the vehicle 10 for sensing the tops of plants to be clipped and signalling conventional circuitry within control 103 for operating the cylinders 100 to adjust the cutter bar height to a predetermined distance below such tops.

In the embodiment shown in FIGS. 1-6, the conveyor housing 46 is open and unobstructed, and the clippings are conveyed upward and rearward therein by the airstream created therein by the flat jet of air emitted by the nozzle opening 54 which blows the clippings off of the cutter bar 38 into the mouth 44 of the conveyor housing 46. The conveyor housing 46 terminates at its upper end in a flexible gasket-like rearwardly facing extension 106 that projects a short distance into a transverse narrow inlet opening in the bin-like container 50 supported on a pair of arms 108 extending rearward from the vehicle frame 12. The flexible extension 106 snugly fits the edges of the opening in the container 50 to prevent clippings from blowing out of the opening while permitting vertical adjustment of the conveyor housing 46 and the container 50 to be dumped as later described. A portion of the walls of the container 50 are air pervious, e.g. made of expanded metal or other suitable screening, to allow air blown thereinto from the conveyor housing 46 to escape while retaining the clippings.

Figure 4:
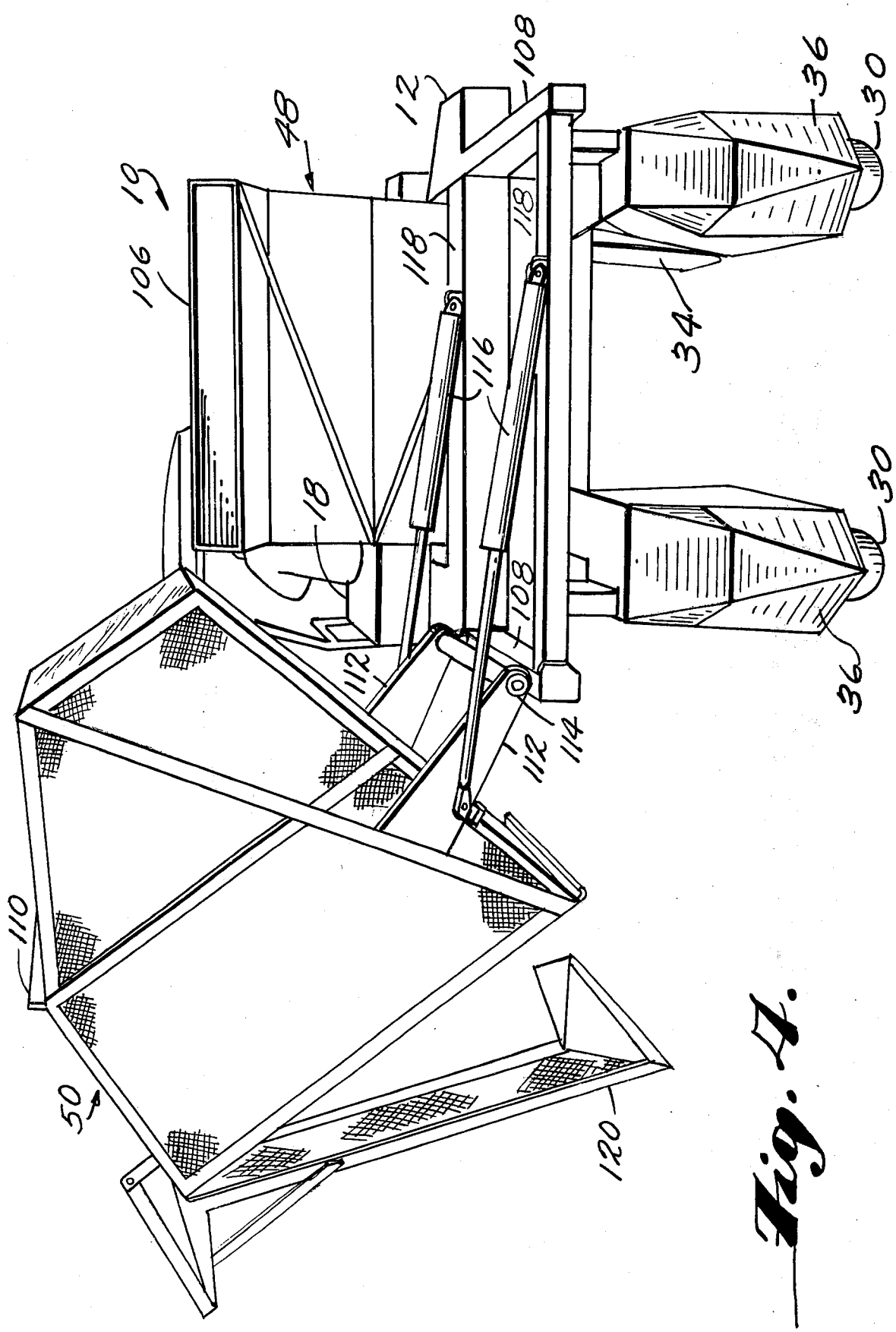
FIG. 4 is a rear perspective view of the harvester shown in FIG. 1 with the clippings-collecting bin shown in dumping position.
Figure 5:
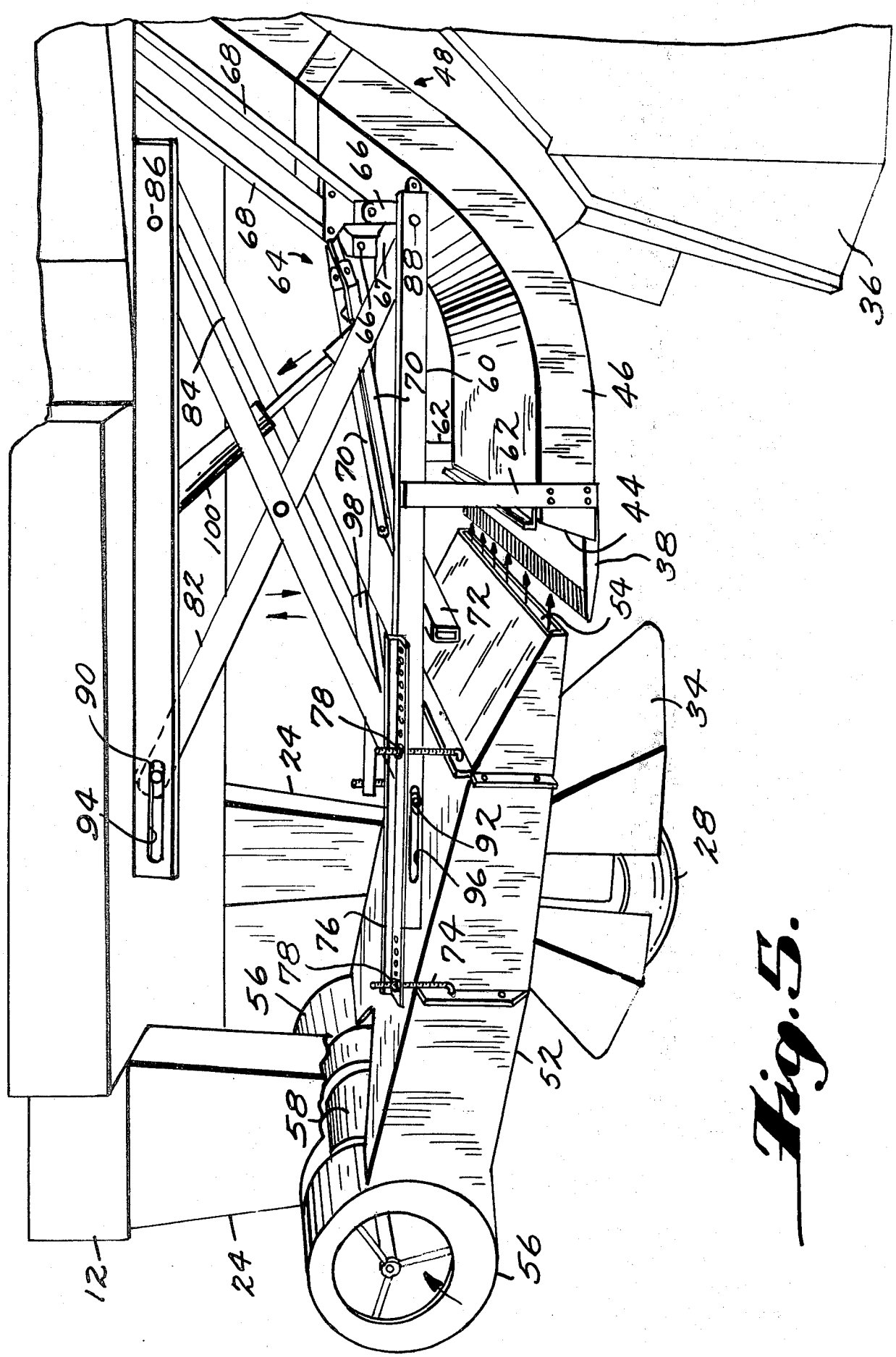
FIG. 5 is an enlarged fragmentary perspective view of a side portion of the harvester shown in FIG. 1. Parts are broken away to show details.

The container 50 may depend below the arms 108 but along one side has a flange 110 which rests for support on the corresponding arm. Projecting laterally from the other side of the bin 50, adjacent its front and rear ends, are brackets 112 pivotally connected, as at 114, to the other arm 108 so that the container 50 can be swung laterally upwardly and outwardly, as shown in FIG. 4, to dump the clippings therein into an appropriate receiving receptacle (not shown) e.g. an open-body truck or the like, alongside the vehicle 10. Dumping movement of the bin 50 may be effected by a pair of hydraulic cylinders 116 controlled from the driver's station and pivotally connected to brackets or members 118 extending transversely between the arms 108 with the ends of their piston rods pivotally connected to the brackets 112 adjacent the containers 50.

A normally-closed hinged lid 120 for the container 50 swings open when the container is in dumping position, as shown in FIG. 4. Preferably, suitable shock-absorbing mechanism (not shown) is connected between the lid 120 and the container 50 to assure gentle opening and closing movements of the lid.

Instead of the dumpable container 50, the arms 108 could be eliminated and a similar container could be carried on a suitable trailer (not shown) hitched to the vehicle 10 for receiving the clippings from the conveyor housing 46. Several such trailers and bins could be provided, with one being trailed and loaded while others are being taken to a collection point for unloading and return. Another alternative would be to detachably carry a fork lift-engageable container (not shown) on the arms 108 which could be removed, when full, and replaced by an empty container by a conventional fork-lift truck (not shown).

While the high velocity air conveyor 48 has proved to be practical and efficient in an actual experimental prototype embodiment of the invention, it is possible to replace it with a mechanical conveyor of the endless type, as shown in FIG. 7. In this arrangement, the under wall of the conveyor housing 46 can be replaced, except for a short section just rearward of the cutter bar 38, with the upper run 122 of an endless-belt conveyor 124 provided with transverse cleats 126 which engage and lift the clippings. The endless belt 128 is trained over a lower guide roller 130, over upper and lower guide rollers 132, 134 at the upper discharge end of the conveyor housing 46, and over a discharge roller 136 located in and adjacent the top of an appropriate container 138. The rollers 130, 132, 134, 136 are journalled on the side members of an appropriate frame support 140 carried by the frame 60 outside the conveyor housing 46. The belt 128 may be driven by an appropriate motor (not shown), e.g., hydraulic, and powered by the pump 22, connected to the lower roller 130. The container 138, which desirably has perforate walls, has a suitable opening for receiving the discharge roller 136 and a removable top 142. The container 138 may be detachably supported on the vehicle arms 108 and designed to be lifted off, for conveyance to a discharge location by a fork-lift truck (not shown), or rotated rearwardly to dump similarly to the previous embodiment.

In this mechanical conveyor arrangement, the clippings are blown off the cutter bar 38 into the mouth of the conveyor, but the airstream from the manifold 52 need not have as large a flow rate and velocity as in the previously described embodiment because the clippings are transported upwardly and rearwardly by the endless belt 128. Hence, the manifold 52, blowers 56 and motor 58 may be reduced in size.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

What is claimed is:

1. A harvester for tea or the like comprising:
   a wheeled vehicle adapted to straddle at least one row of plants;
   a cutter bar carried horizontally and transversely by said vehicle in position to clip the tops of the plants in a row on forward movement of said vehicle;
   a blower and manifold assembly carried by said vehicle for emitting a horizontally-elongated vertically narrow stream of air rearwardly and downwardly across the top of said cutter bar for blowing clippings rearwardly of said bar to a conveyor assembly, the undersurface of said blower and manifold assembly and the airstream-defining outlet thereof being spaced above and forwardly of said bar to enable the tops of the plants to stand upright in the path of the airstream while being clipped;
   a closed ramp-like conveyor assembly having an open mouth extending along the rear edge of said cutter bar to receive the airstream and clippings blown thereby, said conveyor assembly extending rearwardly and upwardly of said mouth to convey the clippings to a collection receptacle by the airstream entering said mouth;
   and means mounting said cutter bar, conveyor assembly and blower and manifold assembly to said vehicle for vertical adjustment relative thereto to adjust the aboveground cutting height of said bar.

2. The structure defined in claim 1 including means for adjusting the vertical height of the blower and manifold assembly relative to the cutter bar.

3. The structure defined in claim 1 including means for adjusting the horizontal distance between the blower and manifold assembly and the cutter bar.

4. The structure defined in claim 1 including an air pervious bin assembly carried by the vehicle to receive clippings from the conveyor assembly.

5. The structure defined in claim 4 in which the bin assembly has a hinged top and including means mounting said bin assembly to the vehicle for lateral dumping pivotal movement wherein said top will open automatically in dumping position of said bin assembly and close automatically on return of said bin assembly to receiving position.

6. The structure defined in claim 5 in which the bin assembly has a horizontally elongated front opening adjacent the top thereof for receiving clippings from the conveyor assembly and the latter is provided with a flexible gasket assembly extending into said opening to prevent clippings from blowing out of said opening.

7. The structure defined in claim 1 in which the vehicle has a frame and pairs of front and rear wheels secured thereto, and the bar is carried beneath said frame between said wheel pairs.

8. The structure defined in claim 7 in which the blower and manifold assembly is carried beneath the frame.

9. The structure defined in claim 1 in which the vertical height of the mouth of the conveyor assembly is greater than the vertical height of the outlet of the blower and manifold assembly.

10. The structure defined in claim 9 in which the lower edge of the mouth is secured to the rear edge of the cutter bar.

11. The structure defined in claim 1 including means for adjusting the blower and manifold assembly to adjust the angle of the stream of air relative to the horizontal.

12. A harvester for tea or the like comprising:

a wheeled vehicle adapted to straddle at least one row of plants;

a cutter bar carried horizontally and transversely by said vehicle in position to clip the tops of the plants in a row on forward movement of said vehicle;

a blower and manifold assembly carried by said vehicle for emitting a horizontally-elongated vertically narrow stream of air rearwardly and downwardly across the top of said cutter bar for blowing clippings rearwardly of said bar to a conveyor, the undersurface of said blower and manifold assembly and the airstream-defining outlet thereof being spaced above and forwardly of said bar to enable the tops of the plants to stand upright in the path of the airstream while being clipped;

a closed ramp-like conveyor assembly having an open mouth extending along the rear edge of said cutter bar to receive the airstream and clippings blown thereby, said conveyor assembly including an endless belt having transverse clipping engaging means thereon movable with said belt along an operative run extending rearwardly and upwardly of said mouth to convey the clippings to a collection receptacle;

and means mounting said cutter bar, conveyor assembly and blower and manifold assembly to said vehicle for vertical adjustment relative thereto to adjust the above-ground cutting height of said bar.

13. A harvester for tea or the like comprising:

a wheeled vehicle adapted to straddle at least one row of plants;

a cutter bar carried horizontally and transversely by said vehicle in position to clip the tops of the plants in a row on forward movement of said vehicle;

a blower and manifold assembly carried by said vehicle for emitting a horizontally-elongated vertically narrow stream of air rearwardly and downwardly across the top of said cutter bar for blowing clippings rearwardly of said bar to a conveyor, the undersurface of said blower and manifold assembly and the airstream-defining outlet thereof being spaced above and forwardly of said bar to enable the tops of the plants to stand upright in the path of the airstream while being clipped;

a closed ramp-like conveyor assembly having an open mouth extending along the rear edge of said cutter bar to receive the airstream and clippings blown thereby, said conveyor assembly extending rearwardly and upwardly of said mouth to convey the clippings to a collection receptacle;

means mounting said cutter bar, conveyor assembly and blower and manifold assembly to said vehicle for vertical adjustment relative thereto to adjust the above-ground cutting height of said bar; and means carried by the vehicle for sensing the height of the plants to be clipped and for automatically adjusting the mounting means accordingly.

* * * * *